(12) United States Patent
Martin et al.

(10) Patent No.: US 7,751,432 B2
(45) Date of Patent: Jul. 6, 2010

(54) SYSTEMS AND METHOD FOR A DISPATCH COMMUNICATION ROUTER

(75) Inventors: David Martin, Chantilly, VA (US);
Corey Gates, Mountain View, CA (US);
Frank Chu, Mountain View, CA (US)

(73) Assignee: Nextel Communications Inc., Reston, VA (US)

( * ) Notice: Subject to any disclaimer, the term of this patent is extended or adjusted under 35 U.S.C. 154(b) by 1098 days.

(21) Appl. No.: 11/311,223

(22) Filed: Dec. 20, 2005
(Under 37 CFR 1.47)

(65) Prior Publication Data

US 2007/0019656 A1 Jan. 25, 2007

Related U.S. Application Data

(60) Provisional application No. 60/636,870, filed on Dec. 20, 2004.

(51) Int. Cl.
*H04L 12/28* (2006.01)
*H04J 3/16* (2006.01)

(52) U.S. Cl. .................................. 370/466; 370/401
(58) Field of Classification Search ................ 370/401, 370/466
See application file for complete search history.

(56) References Cited

U.S. PATENT DOCUMENTS

| | | | |
|---|---|---|---|
| 6,272,127 B1 | 8/2001 | Golden et al. | |
| 6,385,195 B2 * | 5/2002 | Sicher et al. | 370/356 |
| 6,452,924 B1 | 9/2002 | Golden et al. | |
| 6,735,621 B1 * | 5/2004 | Yoakum et al. | 709/218 |
| 6,904,035 B2 * | 6/2005 | Requena | 370/338 |
| 7,155,255 B2 * | 12/2006 | Blum et al. | 455/560 |
| 7,328,042 B2 | 2/2008 | Choksi | |
| 7,359,731 B2 * | 4/2008 | Choksi | 455/552.1 |
| 7,606,261 B2 * | 10/2009 | Salovuori | 370/466 |
| 2002/0197994 A1 * | 12/2002 | Harris et al. | 455/445 |
| 2004/0032843 A1 * | 2/2004 | Schaefer et al. | 370/338 |
| 2004/0190535 A1 * | 9/2004 | Albal et al. | 370/401 |
| 2006/0034260 A1 * | 2/2006 | Svedberg et al. | 370/352 |
| 2006/0063542 A1 * | 3/2006 | Choksi | 455/507 |
| 2006/0159121 A1 * | 7/2006 | Sakata et al. | 370/466 |
| 2009/0239527 A1 * | 9/2009 | Forsten et al. | 455/426.1 |

OTHER PUBLICATIONS

International Search Report and Written Opinion for PCT/US05/46026 dated Sep. 20, 2006.

* cited by examiner

*Primary Examiner*—Chi H Pham
*Assistant Examiner*—Warner Wong

(57) ABSTRACT

Systems and methods for a dispatch communication router are provided. The dispatch communication router allows calls between two or more dispatch communication networks which operate using different dispatch communication protocols. The dispatch communication router includes a protocol interworking function, a media control stack and a transcoding function. The dispatch communication router also includes a dispatch technology protocol stack for each different dispatch communication protocol supported by the router. The dispatch technology protocol stack converts dispatch communication signaling of a particular dispatch communication technology into a common protocol. The dispatch technology protocol stack can also convert dispatch communication media into a common dispatch communication media protocol and media format, or a separate transcoder can be provided to perform such conversion. The dispatch communication router of the present invention allows support of new dispatch communication technologies by adding a new dispatch technology protocol stack and communication coders (if necessary).

21 Claims, 6 Drawing Sheets

SYSTEMS AND METHOD FOR A DISPATCH COMMUNICATION ROUTER

The present application claims priority under 35 U.S.C. §119 to U.S. Provisional Application No. 60/636,870, filed Dec. 20, 2004, the entire disclosure of which is herein expressly incorporated by reference.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a push-to-talk (PTT) or walkie-talkie type of call such as Sprint Nextel Corporation's service identified by the trade name Direct Connect. Interconnect voice communication services provided by most cellular carriers can be provided between sources and destinations of different cellular carriers. However, dispatch communication services are typically implemented using different protocols which prevents dispatch calls from originating in one cellular carrier's network and terminating in another cellular carrier's network.

SUMMARY OF THE INVENTION

Systems and methods for a dispatch communication router are provided. The dispatch communication router allows calls between two or more dispatch communication networks which operate using different dispatch communication protocols. The dispatch communication router includes a protocol interworking function, a media control stack and a transcoding function. The dispatch communication router also includes a dispatch technology protocol stack for each different dispatch communication protocol supported by the router. The dispatch technology protocol stack converts dispatch communication signaling of a particular dispatch communication technology into a common protocol. The dispatch technology protocol stack can also convert dispatch communication media into a common dispatch communication media protocol and media format, or a separate transcoder can be provided to perform such conversion. The dispatch communication router of the present invention allows support of new dispatch communication technologies by adding a new dispatch technology protocol stack and communication coders (if necessary).

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
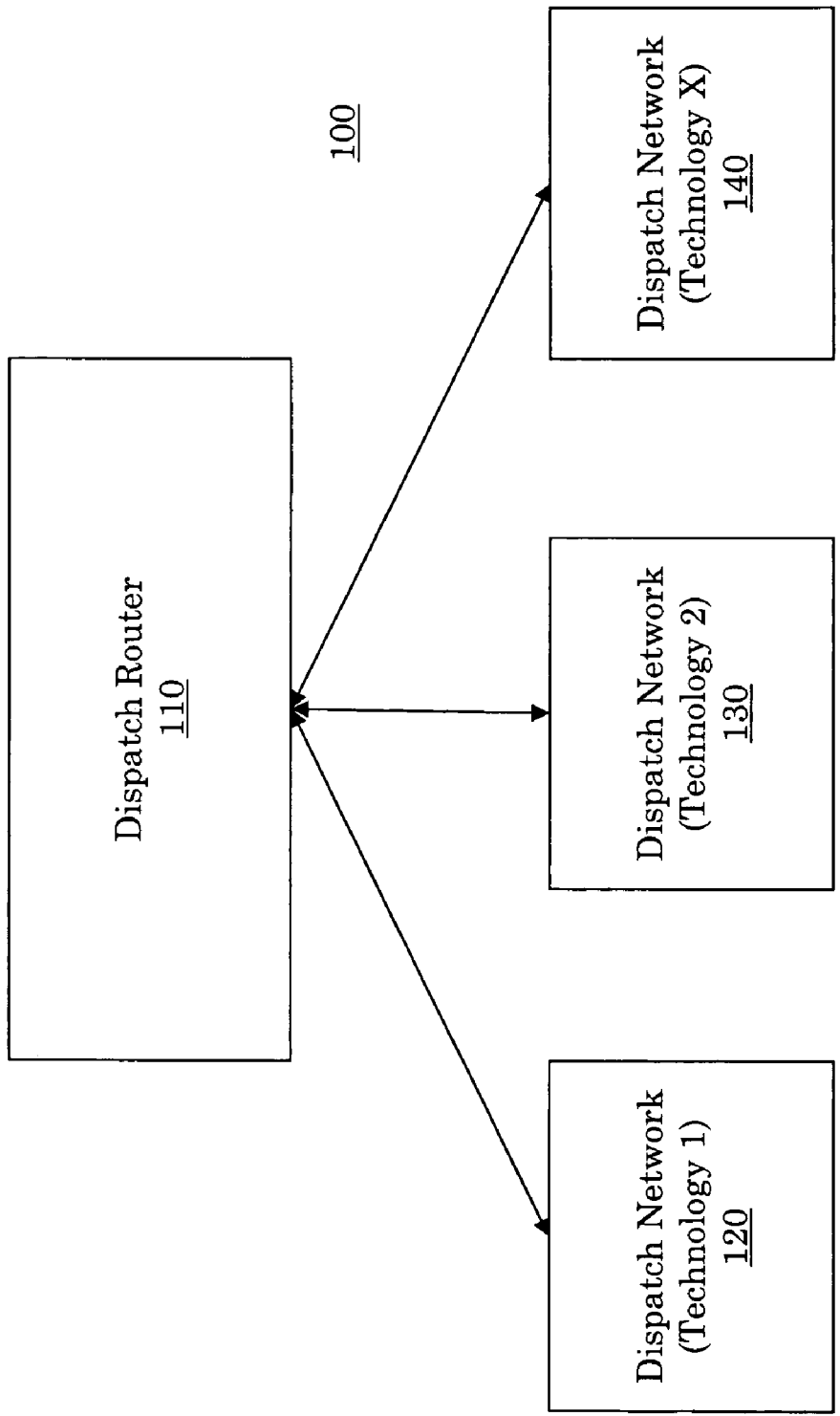
FIG. 1 illustrates an exemplary communication system in accordance with the present invention.

FIG. 1 illustrates an exemplary communication system 100 in accordance with the present invention. The communication system includes a dispatch router 110 coupled to two or more dispatch communication networks. Specifically, the dispatch router 110 is coupled to dispatch communication networks 120, 130 and 140. Dispatch communication network 120 operates using dispatch communication technology 1, dispatch communication network 130 operates using dispatch communication technology 2, and dispatch communication network 140 operates using dispatch communication technology X. The different dispatch technologies can be Integrated Dispatch Enhanced Network (trademarked by Motorola, Inc. as iDEN®), a high performance push-to-talk (HPPTT) protocol, such as the functionality offered by Qualcomm, Inc. under the trademark QChat®, a private radio dispatch, push-to-talk over cellular (PoC), or any other dispatch communication technology.

Although FIG. 1 illustrates the dispatch router being coupled to a plurality of different dispatch communication networks, the dispatch router can also be coupled to a dispatch communication portion of a communication network, which also supports interconnect and/or data communications. Additionally, the dispatch router 110 can be coupled to a number of dispatch communication networks which operate using the same dispatch communication technology, but controlled by different network operators.

Figure 2A:
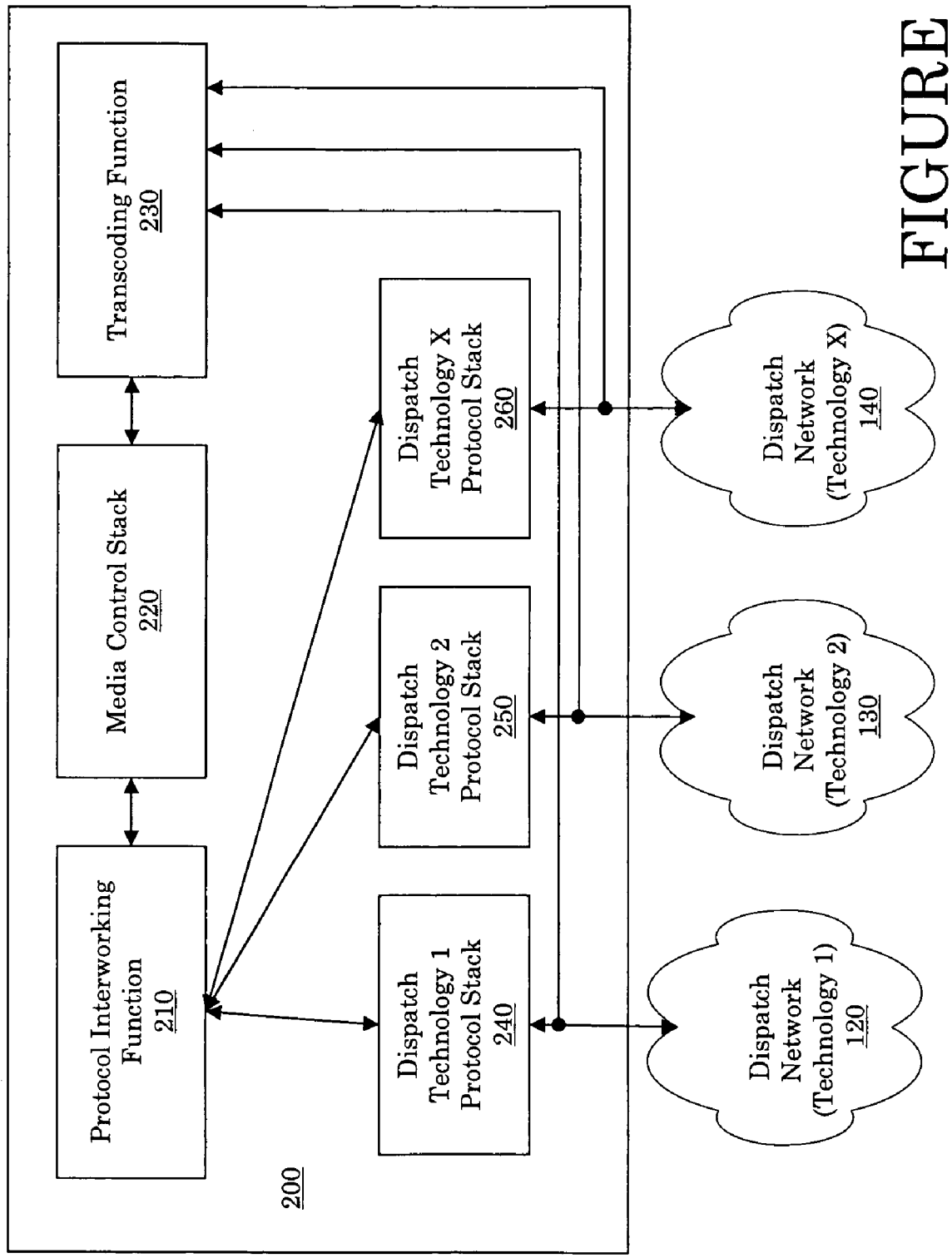
FIG. 2a illustrates an exemplary dispatch communication router in accordance with one embodiment of the present invention.

FIG. 2a illustrates an exemplary dispatch communication router 200 in accordance with one embodiment of the present invention. The dispatch communication router 200 includes a protocol interworking function 210, media control stack 220, transcoding function 230, and dispatch technology protocol stacks 240-260. The protocol interworking function 210 is coupled to the dispatch technology protocol stacks 240-260, and to media control stack 220. The transcoding function 230 is coupled to the media control stack 220, and to the communication line coupling the dispatch technology protocol stacks 240-260 and the dispatch networks 120-140. Although FIG. 2a illustrates only a single dispatch network coupled to each dispatch technology protocol stack, a particular dispatch technology protocol stack can be coupled to more than one dispatch network operating according to the same dispatch communication protocols.

The dispatch technology protocol stacks 240-260 convert the dispatch signaling received from the respective dispatch technology networks into a common signaling. The common signaling can be session initiation protocol (SIP), SIP-based, or any other type of signaling protocol. The dispatch technology protocol stacks 240-260 also convert the common signaling received from protocol interworking function 210 into the appropriate dispatch technology for the corresponding dispatch communication network 120-140.

Because different dispatch technologies may employ different types of communication coders (such as voice coders), transcoding function 230 converts the media portion of the dispatch communication into the appropriate coding format. For example, for dispatch communications between dispatch networks 120 and 130, transcoding function would convert communications from dispatch network 120 into the media protocol and media format used in dispatch network 130, and vice-versa. If transcoding is required, the protocol interworking function 210 provides such information to media control stack 220. The media control stack 220 then provides information to transcoding function 230 as to which dispatch communications require transcoding, the source and destination protocols and coding formats. Known voice coders which can be included in transcoding function 230 include Enhanced Variable Rate Codec (EVRC), Vector Sum Excited Linear Predictive (VSELP), G.711, and the like.

The protocol interworking function 210, media control stack 220, transcoding function 230 and dispatch technology protocol stacks 240-260 can be implemented as software running on a microprocessor, an application specific integrated circuit (ASIC), field programmable gate array (FPGA), or the like. Additionally, although the various elements of router 200 are illustrated as separate elements, these elements can be combined in a single software program running on a microprocessor, ASIC, FPGA, or the like.

The dispatch communications router 200 can include an interface (not illustrated) for web-based provisioning and network management. The web-based provisioning and network management can be for provisioning server parameters, monitoring call statistics, alarms and traps via Simple Network Management Protocol (SNMP) and call tracing.

Figure 2B:
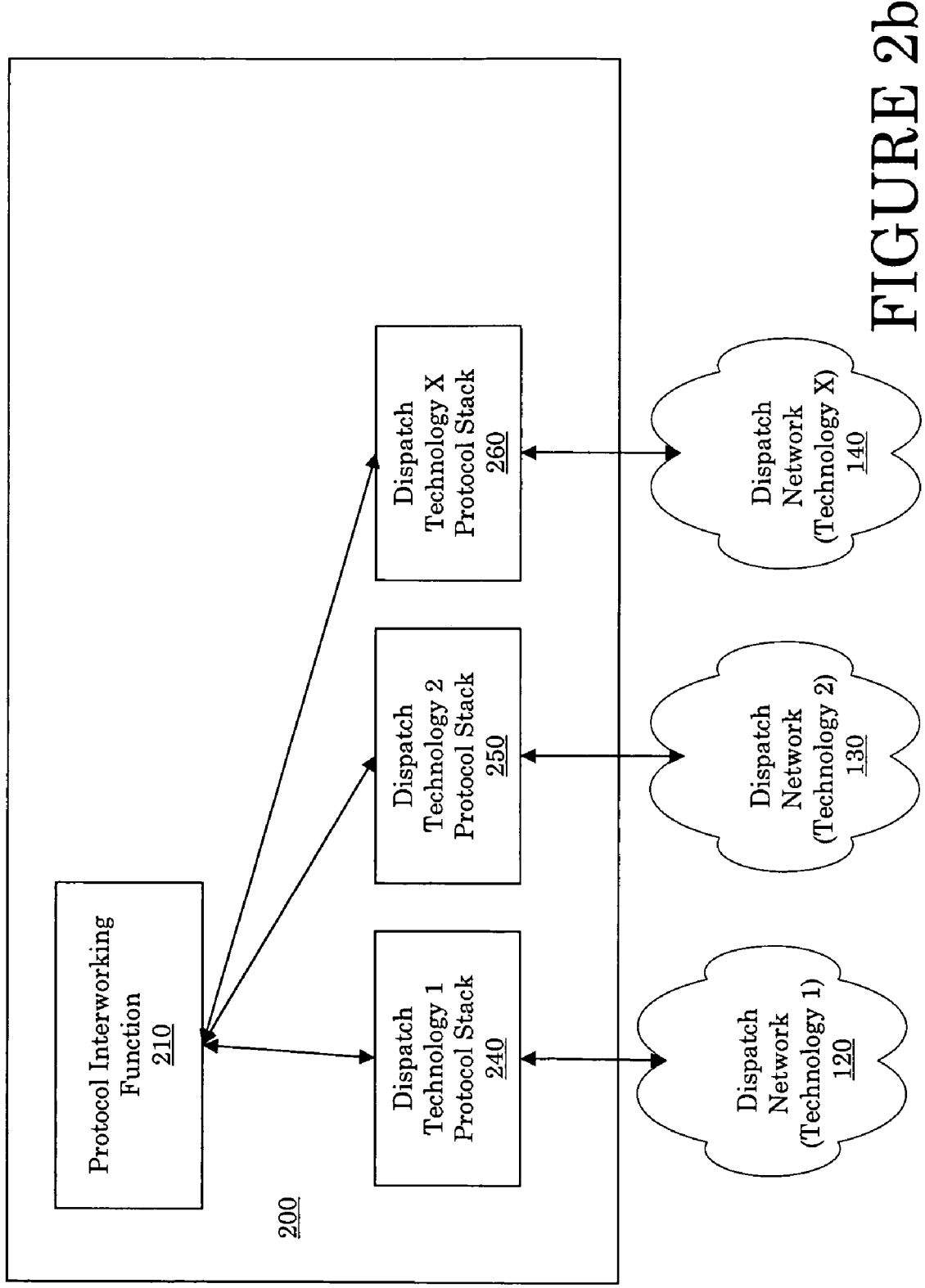
FIG. 2b illustrates an exemplary dispatch communication router in accordance with another embodiment of the present invention.

FIG. 2b illustrates an exemplary dispatch communication router in accordance with another embodiment of the present invention. The dispatch communication router of FIG. 2b is similar to that of FIG. 2a, except that the dispatch communication router of FIG. 2b does not include a media control stack or transcoding function. In accordance with this embodiment of the present invention, each of the dispatch technology protocol stacks convert the dispatch communication media from the format of the associated dispatch communication network into a common dispatch communication media format. The common dispatch communication media format can include packets formatted in, for example, a real-time protocol (RTP) format, and the media itself formatted as pulse code modulated (PCM), wav, or the like.

Figure 3:
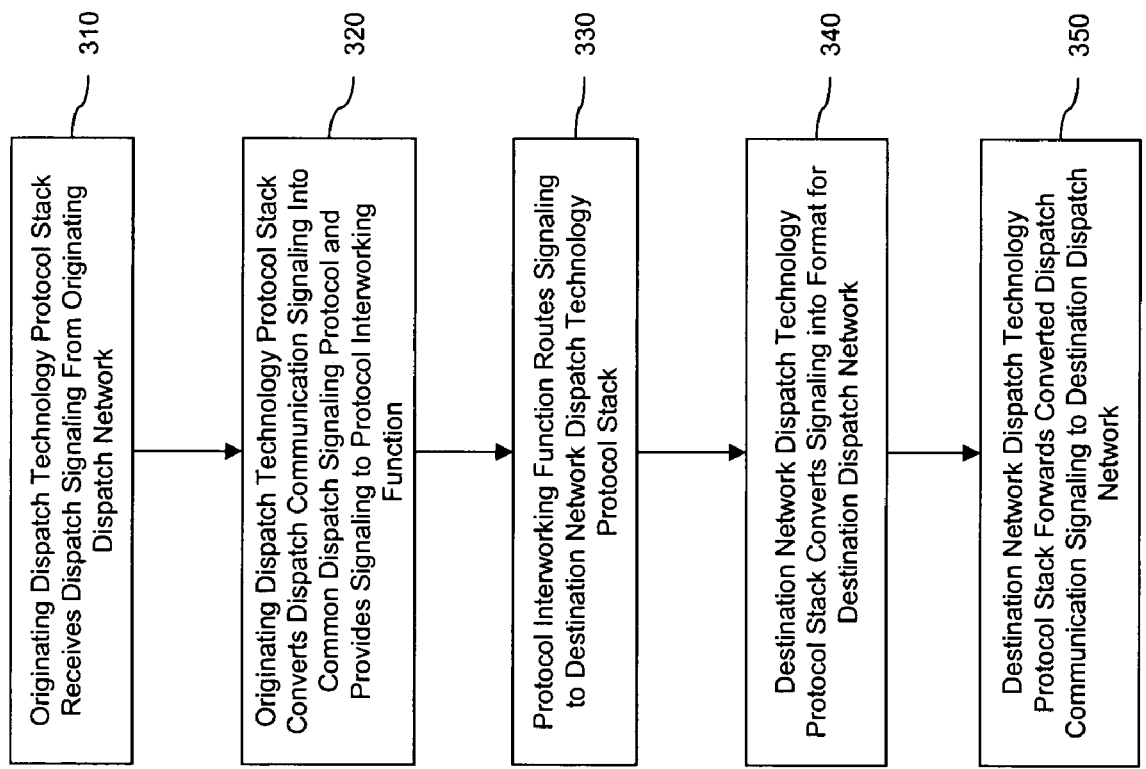
FIG. 3 illustrates an exemplary method for routing dispatch communication signaling by a dispatch communication router in accordance with the present invention.

FIG. 3 illustrates an exemplary method for routing dispatch communication signaling by a dispatch communication router in accordance with the present invention. Initially, an originating dispatch technology protocol stack receives dispatch signaling from an originating dispatch network (step 310). The originating dispatch technology protocol stack converts the dispatch communication signaling from a format of the originating dispatch communication network into a common dispatch communication signaling protocol, and provides the converted signaling to the protocol interworking function (step 320). The protocol interworking function then routes the signaling to the destination network dispatch technology protocol stack (step 330). The destination dispatch technology protocol stack converts the signaling from the common signaling format into a format of the destination dispatch network (step 340). The destination network dispatch technology protocol stack then forwards the converted dispatch communication signaling to the destination dispatch network (step 350).

Figure 4A:
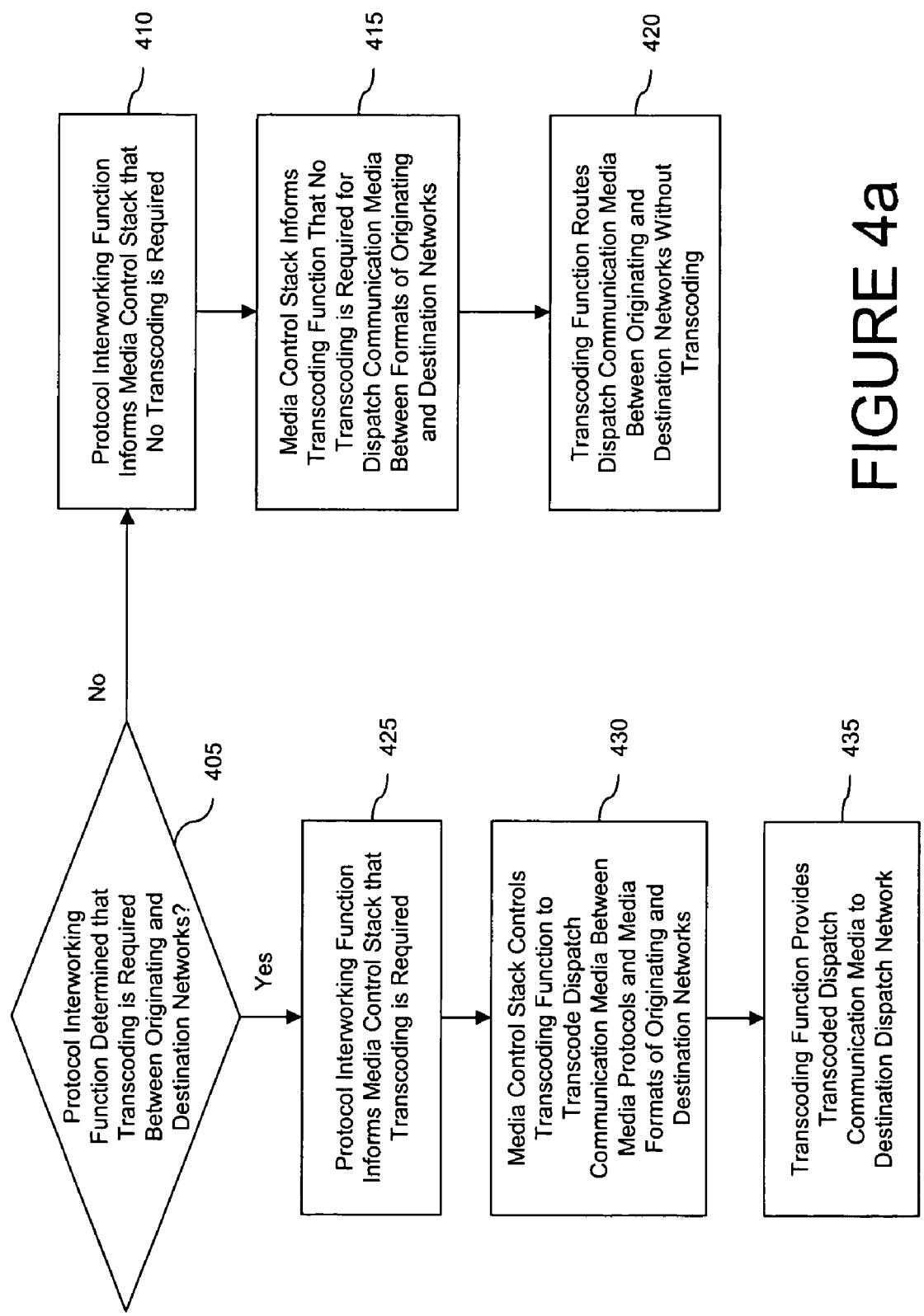
FIG. 4a illustrates an exemplary method for routing dispatch communication media by a dispatch communication router in accordance with one embodiment of the present invention.

FIG. 4a illustrates an exemplary method for routing dispatch communication media by a dispatch communication router in accordance with one embodiment of the present invention. This method can be used with the dispatch communication router illustrated in FIG. 2a. For each dispatch communication between an originating and destination dispatch network, the protocol interworking function determines whether transcoding of the media is required (step 405). When media transcoding is not required ("No" path out of decision step 405), then the protocol interworking function informs the media control stack that transcoding is not required (step 410). The media control stack then informs the transcoding function that no transcoding is required (step 415). The transcoding function routes dispatch communication media between the originating and destination dispatch networks without performing any transcoding (step 420).

When media transcoding is required ("Yes" path out of decision step 405), then the protocol interworking function informs the media control stack that transcoding is required (step 425). The media control stack then controls the transcoding function to transcode dispatch communication media between the media protocols and media formats of the originating and destination dispatch networks (step 430). The transcoding function provides the transcoded dispatch communication media to the destination dispatch network (step 435).

Figure 4B:
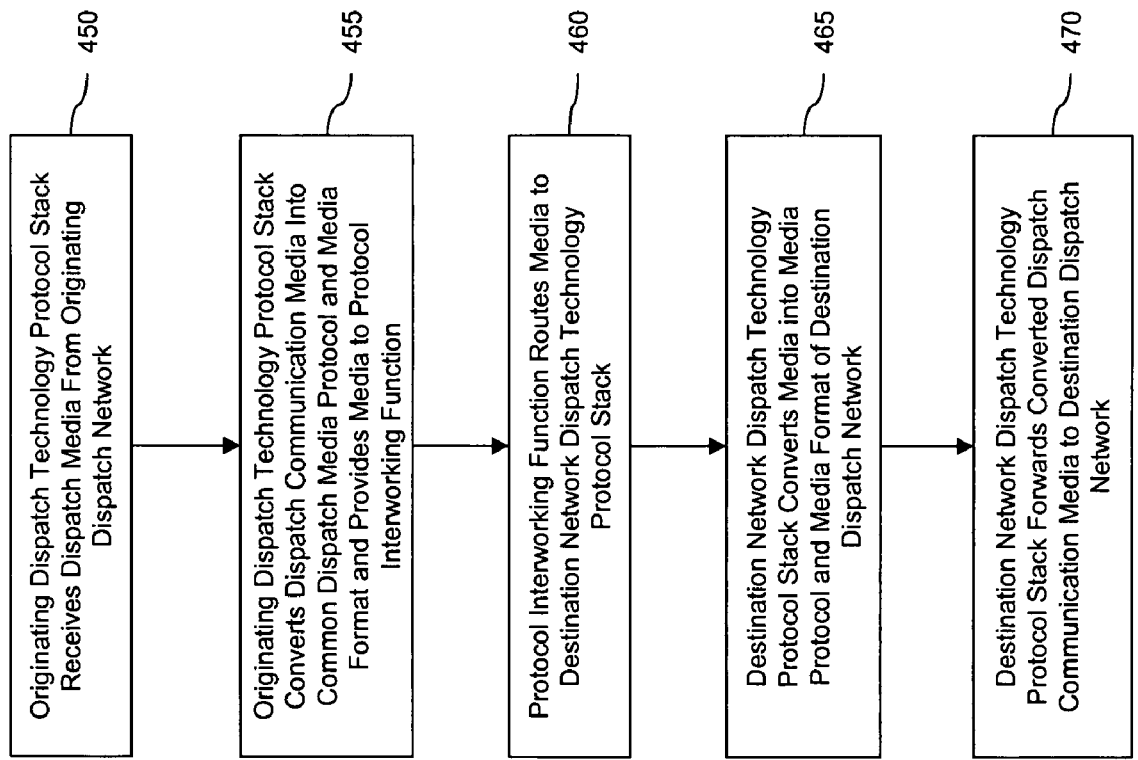
FIG. 4b illustrates an exemplary method for routing dispatch communication media by a dispatch communication router in accordance with another embodiment of the present invention.

FIG. 4b illustrates an exemplary method for routing dispatch communication media by a dispatch communication router in accordance with another embodiment of the present invention. This method can be used with the dispatch communication router illustrated in FIG. 2b. Initially, an originating dispatch technology protocol stack receives dispatch media from an originating dispatch network (step 450). The originating dispatch technology protocol stack converts the dispatch communication media from a media protocol and media format of the originating dispatch communication network into a common dispatch communication protocol and media, and provides the converted media to the protocol interworking function (step 455). The protocol interworking function then routes the media to the destination network dispatch technology protocol stack (step 460). The destination dispatch technology protocol stack converts the media from the common media protocol and media format into a media protocol and media format of the destination dispatch network (step 465). The destination network dispatch technology protocol stack then forwards the converted dispatch communication media to the destination dispatch network (step 470).

The dispatch router of the present invention provides a single network element which can be used to allow communication between dispatch networks which operate using different dispatch communication protocols and/or different communication coders. Accordingly, if it is desired to interoperate with another dispatch communication technology which is not currently supported by the dispatch router, a new dispatch technology protocol stack (and coders, as required) would be added to the dispatch router. This modular architecture provides many advantages over conventional gateway technology in which each network employs a different gateway for each different network being interfaced with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dispatch communication router comprising:
   a microprocessor, the microprocessor executing the following:
   a protocol interworking function;
   a media control stack coupled to the protocol interworking function;
   a first dispatch technology protocol stack coupled to the protocol interworking function and to a first dispatch technology network, wherein the first dispatch technology protocol stack is arranged to convert dispatch communication signaling received from the first dispatch technology network into a common dispatch communication technology signaling format; and a second dispatch technology protocol stack coupled to the protocol interworking function and to a second dispatch technology network, wherein the second dispatch technology protocol stack is arranged to convert the common dispatch communication technology signaling format into dispatch communication signaling for the second dispatch technology network, and wherein the first and second dispatch technology networks operate in accordance with different dispatch communication protocols.

2. The dispatch communication router of claim 1, further comprising:

a transcoder, wherein the first and second dispatch technology networks operate using different communication coders, and the transcoder converts media for dispatch communications between the first and second dispatch technology networks.

3. The dispatch communication router of claim 1, wherein a third dispatch technology network is coupled to the first dispatch technology protocol stack, wherein the first and third dispatch technology networks operate in accordance with the same dispatch communication technology.

4. The dispatch communication router of claim 1, wherein the first dispatch technology network operates according to a high performance push-to-talk protocol and the second dispatch technology network operates according to a Push to talk over Cellular (PoC) protocol.

5. The dispatch communication router of claim 1, wherein the common dispatch communication technology signaling format is a session initiation protocol (SIP) format.

6. The dispatch communication router of claim 1, wherein the first dispatch technology protocol stack is arranged to convert dispatch communication media received from the first dispatch technology network into a common dispatch communication technology media protocol.

7. The dispatch communication router of claim 6, wherein the common dispatch communication technology media format is a real-time protocol (RTP).

8. The dispatch communication router of claim 6, wherein the first dispatch technology protocol stack is arranged to convert dispatch communication media received from the first dispatch technology network into a common dispatch communication technology media format.

9. The dispatch communication router of claim 8, wherein the common dispatch communication technology media format is a pulse code modulation (PCM) format.

10. The dispatch communication router of claim 1, further comprising:

a third dispatch technology protocol stack coupled to the protocol interworking function and to a third dispatch technology network.

11. A method for routing dispatch communications between a first dispatch network and a second dispatch network, the method comprising the acts of:

receiving a dispatch communication, by a dispatch communication router, from the first dispatch communication network;

converting the dispatch communication into a common dispatch communication protocol by a first dispatch technology protocol stack of the dispatch communication router;

converting the dispatch communication in the common dispatch communication protocol into a second dispatch communication protocol by a second dispatch technology protocol stack of the dispatch communication router; and transmitting the dispatch communication in the second dispatch communication protocol to the second dispatch communication network.

12. The method of claim 11, wherein the dispatch communication comprises dispatch communication signaling and media.

13. The method of claim 12, wherein the common dispatch communication protocol of the dispatch communication signaling is a session initiation protocol (SIP).

14. The method of claim 12, wherein the common dispatch communication protocol of the dispatch communication media is a real-time protocol (RTP).

15. The method of claim 14, further comprising the act of:

converting dispatch communication media into a common dispatch communication media format.

16. The method of claim 15, wherein the common dispatch communication media format is a pulse code modulation (PCM) format.

17. The method of claim 11, further comprising the acts of:

receiving dispatch communication media from the first dispatch communication network;

converting the dispatch communication media from a protocol and format of the first network into a protocol and format of the second network; and transmitting the converted dispatch communication media to the second network.

18. The method of claim 11, further comprising the acts of:

determining whether a dispatch communication media protocol and format of the first and second networks are the same; and converting the dispatch communication media from a media protocol and media format of the first network into a media protocol and media format of the second network when the dispatch communication media formats of the first and second networks are different.

19. The method of claim 11, wherein the first dispatch communication network operates according to a high performance push-to-talk protocol and the second dispatch communication network operates according to a Push to talk over Cellular (PoC) protocol.

20. The dispatch communication router of claim 1, wherein the second dispatch technology protocol stack is arranged to convert dispatch communication signaling received from the second dispatch technology network into the common dispatch communication technology signaling format, and wherein the first dispatch technology protocol stack is arranged to convert dispatch signaling in the common dispatch communication technology signaling format into dispatch communication signaling for the first dispatch technology network.

21. The method of claim 11, further comprising:

receiving a dispatch communication from the second dispatch communication network;

converting the dispatch communication from the second dispatch communication network into the common dispatch communication protocol;

converting the dispatch communication in the common dispatch communication protocol associated with the dispatch communication from the second dispatch communication network into the first dispatch communication protocol; and transmitting the dispatch communication in the first dispatch communication protocol to the first dispatch communication network.

* * * * *